United States Patent [19]

Joh

[11] 4,115,351

[45] Sep. 19, 1978

[54] FLAME RETARDANT COMPOSITION

[76] Inventor: Yasushi Joh, Osaka, Japan

[21] Appl. No.: 585,053

[22] Filed: Jun. 9, 1975

Related U.S. Application Data

[63] Continuation of Ser. No. 414,793, Nov. 12, 1973, abandoned.

[51] Int. Cl.$^2$ .................................................. C08K 5/52
[52] U.S. Cl. ...................... 260/45.9 NP; 260/45.7 P; 260/45.75 R; 264/182; 264/185; 264/211; 428/921
[58] Field of Search ........ 260/45.75, 45.7 P, 45.7 PH, 260/45.9 N, 45.9 NP, 45.9 NC, 28.5 R, 23 AR, 23 R, 33.6 UA; 264/182, 185, 211; 428/921, 394; 526/2

[56] References Cited

U.S. PATENT DOCUMENTS

| | | | |
|---|---|---|---|
| 3,030,327 | 4/1962 | Horsch | 260/45.7 P |
| 3,179,588 | 4/1965 | Siimes | 260/2.5 |
| 3,239,482 | 3/1966 | Rapp | 260/45.75 |
| 3,383,241 | 5/1968 | Davisson et al. | 260/45.9 NP |
| 3,434,874 | 3/1969 | Proffitt | 428/394 |
| 3,481,886 | 12/1969 | Lawes | 260/45.9 NP |
| 3,597,385 | 8/1971 | Komorniczyk et al. | 260/33.8 |
| 3,753,770 | 8/1973 | Braude et al. | 260/45.9 NP |
| 3,839,276 | 10/1974 | Rohlfs et al. | 260/45.9 NP |
| 3,862,070 | 1/1975 | Fukushima et al. | 260/45.9 NP |
| 3,900,664 | 8/1975 | Miller | 428/921 |
| 3,944,384 | 3/1976 | Poynton | 260/45.9 NP |

OTHER PUBLICATIONS

The Chemistry & Uses of Fire Retardants by Lyons, 1970, pp. 312 to 317, 412 to 415.
Chemical Abstracts – vol. 63; 1965; Article 17792c.

*Primary Examiner*—V.P. Hoke
*Attorney, Agent, or Firm*—Armstrong, Nikaido, Marmelstein & Kubovcik

[57] ABSTRACT

A flame retardant composition comprises an organic polymer containing one of the inorganic compounds with phosphorus and nitrogen, or either of them in the form of finely powdered crystal. The inorganic compounds are coated with an inactive material.

5 Claims, No Drawings

FLAME RETARDANT COMPOSITION

This is a continuation, of application Ser. No. 414,793, filed Nov. 12, 1973 now abandoned.

BACKGROUND OF THE INVENTION

1. Field of the Invention

This invention relates to a novel non-flammable composite materials and to methods for producing the same. More particularly, this invention is concerned with non-flammable composite materials for application to fibers, plastics, film and other shaped products. The invention pertains to compositions containing at least one of the inorganic compounds with phosphorus and nitrogen, or either of them.

2. Description of the Prior Art

Since two decades before, many products from a petroleum have developed remarkably and innumerable kinds of plastics, synthetic fibers, resins and films have become very popular, and actually these have become to be daily necessities.

The products made from petroleum possess many excellent characteristic features which are unable to be expected for natural products. Therefore, utilizations of the products made from petroleum have developed rapidly especially these recent years. However, products originated from petroleum have a big common defect, namely, easy-flammability. From users, appearances of non-flammable or self-extinguishable materials have long been very anxious, especially for interior materials, fibers for industrial and clothing uses and for architectural things, because there has been pointed out the high possibilities to induce a big disaster caused by the presence of an easy-flammable materials. Actually, many cases of this kind have been reported so far.

Therefore, an addition of non-flammability or self-extinguishable properties to the products is now one of the most urgent problems to be solved, and for this purpose, world-wide researches are now intensively going on. However, the products were made originally from petroleum which is liable to flame, and hence there has been only little success in giving a non-flammability or self-extinguishable property to the products.

Non-flammable fibers are most urgently required, because fibers are now used all over the places and homes, and most of the miserable fire-disasters were due to the presence of easy-flammable fibers. Unfortunately, in spite of many intensive studies, there has been very little useful accomplished in the way for the addition of non-flammability to fibers.

For example, for acrylic fibers, copolymers comprising of acrylonitrile and halogen containing monomers such as vinyl bromide or vinyl chloride were used. But when this copolymer was used for the preparasion of an acrylic fiber, its effect was not satisfactory. In order to give a sufficient flame retardant or self-extinguishable property, more than 10% of vinyl bromide should be incorporated, nevertheless, the effect was still very unsatisfactory. Together with a big cost-up by using large amounts of this expensive monomer, physical and tensile properties of the fiber were reduced considerably as the amounts of incorporated vinyl bromide increased. In additon to this, these copolymer gave poor processability in shaping processes. Also the copolymer effects discoloration.

This also reduced the quality of the fiber, accordingly, reduced the commercial values of the fiber. Furthermore, even if the copolymer could give an appreciable flame retardant properties to some extent, it is still unsatisfactory, and when the fiber are ignited, toxic gases such as bromine gas or hydrogen bromide gas are usually developed. These will increase a disaster remarkably.

SUMMARY OF THE INVENTION

An object of this invention is to provide novel compositions having an excellent non-flammability and self-extinguishable property to the composite materials from which many useful shaped materials can be produced.

Another object of this invention is to provide the inorganic compounds coated with inactive material which are defined as the material having non-reactivity with the inorganic compounds.

First feature of the invention relates to compositions containing at least one of the inorganic compounds with phosphorus (P) and nitrogen (N), or either of them, and methods for the production thereof and shaped products therefrom.

The present invention was made based on a novel idea that non-flammability or self-extinguishability is only effectively achieved when the following these important factors described below are essentially satisfied. The three factors are; (1) retarding of the supply of oxygen, (2) decreasing temperature, (3) formation of extinguishable liquid which is able to cover ignition sites.

The invention is concerned with additives of the following features. When the additives are heated by a fire, a heavy non-flammable gases will be developed, which will cover over ignition sites and retard the supply of oxygen. The thermodecomposition reaction should be an endothermic reaction which effects lowering temperature, and by products liberated by heat decomposition should be extinguishable liquid.

The above idea in mind, the invention finally found that some of inorganic compounds containing at least one of phosphorus or nitrogen or both of them satisfy the above three factors. Among these compounds, especially inorganic compounds with both phosphorus and nitrogen are most effective. The examples of these compounds are ammonium phosphates such as primary ammonium orthophosphate $(NH_4)H_2PO_4$, secondary ammonium orthophosphate $(NH_4)_2HPO_4$, tertiary ammonium orthophosphate $(NH_4)_3PO_4$, ammonium pyrophosphates such as primary ammonium pyrophosphate $(NH_4)H_3P_2O_7$, secondary ammonium pyrophosphate $(NH_4)_2H_2P_2O_7$, and others like $(NH_4)_3HP_2O_7$, $(NH_4)_4P_2O_7$, ammonium phosphites such as $(NH_4)H_2PO_3$, $(NH_4)_2HPO_3$, ammonium hypophosphates such as $(NH_4)_2H_2P_2O_6$, $(NH_4)_3HP_2O_6$, ammonium hypophosphites such as $(NH_4)H_2PO_2$, $(NH_4)_2HPO_2$, ammonium metaphosphate like $(NH_4)PO_3$, and ammonium dihydrogen phosphite $(NH_4)H_2PO_3$ and so forth.

In addition to these examples, compounds with other metal element are also involved, for example, sodium ammonium phosphate $NaNH_4HPO_4$, magnesium ammonium phosphate $(NH_4)MgPO_4$, ammonium phosphomolybdate $(NH_4)_3PO_4 \cdot 12MoO_3$, ammonium phosphotungstate $(NH_4)_3PO_4 \cdot 12WO_3$, ammonium cobalt phosphate $(NH_4)CoPO_4$, ammonium mangan phosphate $(NH_4)MnPO_4$. Furthermore halogen containing compounds such as difluoroammonium phosphate $(NH_4)PO_2F_2$, hexafluoroammonium phosphate $(NH_4)PF_6$, diaminophospho trichloride $Cl_3P(NH_2)_2$, triphospho nitrilochloride $(PNCl_2)_3$, and other compounds such as phosphoamide $OP(NH_2)_2$, metaphosphimic acid $P_3N_3(OH)_6$ and its ammonium salt $P_3N_3O_6H_3(NH_4)_3$, ammonium trithiophosphate $(NH_4)_3POS_3$. The hydrates of the above compounds are also included.

The compounds mentioned above all satisfy the three factors. Especially, liberation of inorganic liquid by thermal decomposition is most important.

Most effective inorganic liquids are phosphoric acid, phosphorous acid, hypophosphoric acid, hypophosphorous acid, metaphosphoric acid, and metaphosphorous acid. These inorganic acids have excellent extinguishable properties covering and forming almost ideal monomolecular film over ignition sites which strongly effects to extinguish fires.

The objection of the present invention can also be achieved by using inorganic compounds containing phosphorus (P) in the combination with or without another inorganic compounds containing nitrogen (N).

The examples of these compounds are the salts of selected from phosphoric acid, phosphorous acid, metaphosphoric acid, metaphosphorous acid, hypophosphorous acid, pyrophosphorous acid, hypophosphoric acid, pyrophosphoric acid and so forth. Kinds of salts are, for example, sodium salt, potassium salt, lithium salt, beryllium salt, magnesium salt, calcium salt, zinc salt, cadmium salt, ammonium salt and so on.

Concreted examples are potassium dihydrogen phosphate $KH_2PO_4$, dipotassium hydrogen phosphite $K_2HPO_3$, potassium pyrophosphate $K_4P_2O_7$, magnesium pyrophosphate $Mg_2P_2O_7$, potassium metaphosphate $(KPO_3)n$, sodium potassium hydrogen phosphate $NaKHPO_4.7H_2O$ disodium dihydrogen pyrophosphate $Na_2H_2P_2O_7$, sodium metaphosphate $(NaPO_3)_6$, disodium dihydrogen hypophosphate $Na_2H_2P_2O_6$, trisodium phosphate $Na_3PO_4.12H_2O$, disodium hydrogen phosphite $Na_2HPO_3.5H_2O$, disodium phosphomolybdate $Na_2PO_4.12MoO_3$, trilithium phosphate $Li_3PO_4.\frac{1}{2}H_2O$, magnesium hydrogen phosphate $MgHPO_4.3H_2O$, disodium hydrogen phosphate $Na_2HPO_4$ and its hydrates $Na_2HPO_4.2H_2O$, $Na_2HPO_4.7H_2O$, $Na_2HPO_4.12H_2O$, sodium dihydrogen phosphate $NaH_2PO_4.H_2O$, primary monomagnesium hydrogen phosphate $MgH_4(PO_4)_2.3H_2O$, trimagnesium phosphate $Mg_3(PO_4)_2.5H_2O$, secondary calcium phosphate $CaHPO_4.2H_2O$, primary calcium hydrogen phosphate $CaH_4(PO_4)_2$, calcium phosphite $CaHPO_3$, tertiary zinc phosphate $Zn_3(PO_4)_2.4H_2O$, secondary zinc phosphite $ZnHPO_3$, zinc pyrophosphate $Zn_2P_2O_7$, aluminium phosphate $AlPO_4$, and so forth.

Examples of inorganic compounds containing nitrogen are ammonium chloride, ammonium carbonate, ammonium hydrogen carbonate, ammonium nitrate, ammonium sulfate, ammonium hydrogen sulfate, ammonium phosphates.

In application of this invention, two or more of the above compounds can also be used, for example, a combination of $(NH_4)H_2PO_4$ and $(NH_4)NaHPO_4$, or a combination of $KH_2PO_4$, $K_2HPO_4$ and $(NH_4)_2CO_3$ can be used.

Another important feature of the present invention is that in application all the surface of the said inorganic compounds are coated, if necessary, with inactive materials which are defined as the material having non-reactivity with the said inorganic compounds.

This is a very important point of this invention because without this, the present invention is not able to be used in some cases. For example, when ammonium phosphate $(NH_4)H_2PO_4$ is tried to use as an additive to a dope in producing a self-extinguishable acrylic fiber, a serious problem happenes. Since the compound is soluble in dimethyl formamide which is used as a solvent for a dope, and also the compound is easily soluble in water which is used in a spinning and stretching baths, the compound added in the dope is easily washed out during the processes of spinning, washing and stretching. As the result, only little amounts of the compound can be retained in the filaments. Furthermore, the compound effects coloration of the fiber to yellow or brown. This coloration greatly reduce a commercial value of the fiber.

In addition the inorganic compounds comes from dope results in troubles in solvent recovery. To solve these problems the inorganic compounds must be changed to a physically and chemically inactive materials. The present invention finally succeeded in removing this unavoidable defect by coating the compounds with physically and chemically inactive materials. The inactive materials used in this invention are, for example, polysiloxane, silicon oil, silicon grease, higher paraffin, saturated or unsaturated compounds of aliphatic or aromatic hydrocarbon having more than 10 carbon atoms, so-called petrolatam, paraffin jelly, Vaseline, liquid paraffin, mineral oil and vegetable oil.

A proposed method of coating for the said inorganic compounds are as follows. First, an inactive material like solid paraffin is first dissolved in a solvent which can dissolve the inactive material, but not for the said inorganic compounds. To this solution, the said inorganic compound is suspended and after all the surfaces of the powdery said inorganic compound are contacted with the solution, the said inorganic compound is filtered or the solvent is evaporated without filtration. Thus surface of the inorganic compound is uniformly coated with thin inactive material.

When powdery ammonium phosphate is coated with a solid paraffin, the compound becomes no longer soluble in dimethylformamide and water, thus when ammonium phosphate is used as a flame retardant additive in the production of acrylic fiber, the coated ammonium phosphate added in a spinning solution does not flow out during the processes of spinning, stretching and washing. Furthermore, the ammonium phosphate is no more chemically active, therefore, no coloration of the fiber occured.

This coating is not always necessary, for example, in the case of melt-spun fiber, processes for which does not involve the use of solvent and water. Nevertheless, the coating is often useful to avoid coloration.

Another feature of the invention is that the said inorganic compound is added in one of the processes in production of shaped materials. The compounds are desirably finely powdered so that, for example, the compounds can go through the holes of spinnerets without trouble like titanium oxide for a dull fiber.

When the said inorganic compound is added in a dope like a titanium oxide, it is quite advantageous and useful for large scale production with high productivity, and for a quality control. On the other hand, in the case of producing acrylic fiber, the said compound can also be effectively added by immersing gel fibers in a aqueous solution containing an inorganic compound immediately after stretching, thus the said inorganic compound can be included in the fiber.

The amounts of the said inorganic compounds are usually lower than 10% based on the shaped materials.

These can be increased or decreased depending on the requirement of the non-flammability. The method presented in this invention is surprising effective in adding non-flammability and self-extinguishable property to the products, actually only a few per cent of the said compound is often enough to pass the most severe vertical non-flammability test.

Another outstanding feature of this invention is that when, for example, fibers applied by the method are ignited, there is no toxic gas developed before ceasing fire.

For example, phosphoric acid liberated from ammonium phosphate by thermal decomposition, which covers ignition sites as a almost ideal monomolecular layer, changes to pyrophosphoric acid or metaphosphoric acid which is a polymeric material having an excellent extinguishable property, thus no toxic gas is developed.

In conclusion, the present invention will provide organic materials and more particularly deals with highly polymeric materials with excellent fire retardant properties such as are employed in the manufacture of molding and extruding compositions, films sheets, fibers, textiles, papers, surfacing or coating compositions, impregnating agent, solid forms, rubbers etc.

The invention can be applied especially for wet and dry spinning fibers such as acrylic fiber, polyvinyl alcohol fiber, viscose rayon, and melt spinning fibers such as nylon, polyester fiber and other fibers such as cellulose di-or triacetate fibers. The invention is also able to apply to plastics and films by adding the said inorganic compounds before shaping.

The invention is illustrated by the following examples which are not to be taken as limiting in any respect. All parts and percentages are by weight unless other wise expressly stated.

DESCRIPTION OF THE PREFERRED EMBODIMENTS

Example 1

A copolymer comprising 93% of acrylonitrile and 7% of vinyl acetate was disolved in a dimethylacetamide to give a spinning solution. A diammonium hydrogen phosphate $(NH_4)_2HPO_4$ (3% based on the copolymer) which had been finely powdered enough to pass through holes of a spinneret and coated with paraffin (mp 68° C) was added to the dope.

The solution was wet-spun by a usual process, then stretched 5 times their original length, washed and dried. Then filaments obtained were subjected to an annealing for relaxation.

Fibers obtained had excellent physical and textile properties similar to a conventional acrylic fiber and a good whiteness.

Results of analysis showed that all the ammonium phosphate used was retained in each filaments. A cloth made from the filaments was dried at 105° C for 3 hours and then was subjected to a vertical ignition test. The flame was ceased immediately after removing an igniter.

On the other hand, filaments were prepared in the similar way except the use of ammonium phosphate which was not coated with the paraffin. The filaments obtained became yellowish to brown during the processes of drying and annealing. At the same time, the result of analysis showed that almost all the ammonium phosphate used was flowed out during spinning and washing processes, thus, only little ammonium phosphate was retained in the filaments.

Example 2

A copolymer comprising 94% of acrylonitrile and 6% of methyl acrylate was dissolved in a nitric acid solvent having a concentration of 69% at −5° C to give a 14% spinning solution. The copolymer had a strong acid group of $10^{-5}$ equivalent per gram.

To this spinning solution, ammonium dihydrogen phosphate $(NH_4)H_2PO_4$ (3.2% based on the copolymer) which had been finely powdered enough to pass through holes of a spinneret and coated with a solid paraffin was added. Then the solution was wet-spun in a usual way into a coagulating bath which contained 30% of nitric acid at −3° C.

Filaments obtained were stretched, washed and dried, then subjected to a steaming for relaxation. Fibers obtained had good textile properties and whiteness. As a result of analysis it was found that all the ammonium phosphate used were retained inside of each filaments.

A fire retardant property of a thick cloth made from the fibers was tested by a vertical method (JIS,L1091-A-4), and it was shown that the flame ceased immediately after an igniter was removed.

Example 3

A copolymer was prepared containing 91% acrylonitrile, 3% vinyl bromide, and 6% acrylamide, and was dissolved in a dimethylsulfoxide to give a dope. To this, ammonium dihydrogen phosphate $(NH_4)H_2PO_4$ (1.5% based on the copolymer) which had been finely powdered and coated with a paraffin was added. Then the solution was wet-spun in a usual manner.

Fibers obtained were essentially the same in textile property and whiteness as a conventional acrylic fiber.

A result of analysis showed that all the ammonium phosphate used was retained inside of each filaments without flowed out during producing processes.

A coth made from the fiber was dried at 105° C for 4 hours, and a fire proofing test for the cloth was made using vertical and 45° C methods. The cloth showed perfect self-extinguishable property. On the other hand, a shaggy carpet was made from the fiber and a fire proofing test was performed by igniting on a tablet of urotropin which was placed on the carpet. The flame was self-extinguished immediately after the urotropin tablet was burned out.

Example 4

A copolymer was prepared containing 60% acrylonitrile and 40% vinyl chloride and the copolymer was dissolved in dimethyl acetamide to give a spinning solution. To this solution, diammonium hydrogen phosphite hydrate $(NH_4)_2HPO_3.H_2O$ (2% based on the copolymer) which had been finely powdered and coated with a paraffin was added.

Then, the solution was wet-spun in a usual way.

A shaggy carpet made from the fibers obtained was tested by igniting on a tablet of urotropin which was placed on the carpet. The flame was extinguished immediately after the urotropin was burn out.

Example 5

A copolymer comprising 94% acrylonitrile and 6% methyl acrylate was dissolved in dimethyl formamide to give a spinning solution. On the other hand, a finely powdered ammonium dihydrogen phosphate was suspended in a decaline solution containing isotactic polypropylene, then filtered, washed with petroleum ether. By this procedure all the surfaces of the powdery ammonium phosphate were uniformly coated with the polypropylene thin film. This (3% based on the copolymer) was added to the spinning solution from which fibers were prepared by a dry spinning. A cloth made from the fibers obtained was dried at 105° C for about 3 hours, then it was subjected to a non-flammability test using a vertical method. It was shown that the cloth had an excellent self-extinguishable property.

Example 6

This example is essentially the same as the example 5 except the use of a paraffin (mp 70° C) instead of polypropylene. The method of coating is that a finely powdered ammonium dihydrogen phosphate was suspended in a benzene or petroleum ether solution which contained about a 5% solid paraffin (mp 78° C), then filtered and dried. Thus, all the surface of the powdery ammonium phosphate was uniformly coated with very thin paraffin. The ammonium phosphate was no longer soluble in dimethyl formamide and water. The fibers obtained in this example showed on excellent self-extinguishable property for a flame retardant vertical test.

Example 7

This example is the same as the example 1 except a ammonium metaphosphite $(NH_4)PO_2$ was used instead of diammonium hydrogen phosphate.

Fibers obtained in this example showed a good self-extinguishable property.

Example 8

To an acetone dope of a cellulose acetate (acetate value per glucose unit: 1.8), a diammonium hydrogen phosphate $(NH_4)_2HPO_4$ (3.5% based on the cellulose acetate) which was finely powdered and coated with a solid paraffin of mp 65° C was added, then the dope was dry-spun by a usual method. The spinnability was excellent and did not make any difference from a conventional case.

Using a cloth made from the fibers thus obtained, a vertical flammability test was performed. The flame was extinguished immediately after a gas burner was removed. The same test was performed for a conventional cellulose acetate fibers. In this case a cloth from the conventional fiber easily caught fire and burned out in a second.

Example 9

In the case of spinning of polyvinyl alcohol fiber, ammonium dihydrogen phosphate (2.5% based on the polyvinyl alcohol) which had been coated with a paraffin of mp 78° C was added to a dope of polyvinylalcohol, then the dope was spun into a saturated aqueous solution of sodium sulfate in a usual manner. Fibers thus obtained were dried at 100° C for 4 hours. Non-flammability of the fiber was tested by a vertical method. The flame was extinguished immediately after an igniter was removed.

Example 10

In a production of viscose rayon fiber, a finely powdered triammonium phosphate hydrate $(NH_4)_3PO_4 \cdot 3H_2O$ (2.5% based on cellulose) which had been coated with a paraffin (mp 69° C) was added to a spinning solution. This solution was wet-spun in a usual way. The spinnability did not make any difference from the usual cases. Fibers obtained showed a satisfactory self-extinguishable property.

Example 11

Polyethylene telephthalate which contained sodium ammonium hydrogen phosphate $NaNH_4HPO_4$ (3.5% based on the polymer) was meltextruded to make chips. Using the chips a melt-spinning was carried out. The spinnability and stretchability were good and did not make any difference from conventional cases. Fibers obtained had a good whiteness and good textile properties.

A cloth made from the fibers was dried at 105° C for 3 hours, then it was subjected to a vertical flammability test. The cloth showed a satisfactory self-extinguishable property.

Example 12

This example is the same as example 11 except ammonium phosphomolybdate $(NH_4)_3PO_4 \cdot 12MoO_3$ (5% based on the polymer) was used instead of ammonium sodium phosphate. A flammability test for a cloth made from the fibers obtained which had been dried at 105° C for 4 hours showed a perfect self-extinguishable property. It was also found that ammonium phosphotungstate $(NH_4)_3PO_4 \cdot 12WO_3$ had a similar effect to the ammonium phosphomolybdate.

Example 13

A finely powdered ammonium dihydrogen phosphate was suspended in a petroleum ether containing a 3% of silicon grease, and then filtered. When the petroleum was evaporated, all the surfaces of the powdery ammonium phosphate were uniformly coated with the thin film of the silicon grease. A mixture of a 97% of nylon and 3% of the above coated phosphate was meltextruded to give nylon filaments. A cloth made from the filaments was dried at 105° C for 5 hours, then its non-flammability was tested by vertical method. The flame easily ceased and the cloth was found to have a good self-extinguishable property.

Example 14

A film was prepared by an inflation method using chips of a polyethylene containing a 4% of ammonium dihydrogen phosphate. Since the film thus prepared contained powdery inorganic materials, its transparency was a little reduced, however, the film had good physical properties. A part of the film (30 mm × 150 mm) was set vertically and it was ignited at the bottom, the flame was ceased immediately after an igniter was removed.

Example 15

To a spinning solution consisting of 85% dimethylformamide and 15% polyacrylonitrile, a powdery hypophosphate $(NH_4)_2H_2P_2O_6$ (5.5% based on polyacrylonitrile) was added. Using this dope, a film was prepared by a wet-process. The film obtained was stretched biaxially. A part of the film (30 mm × 150 mm) was hung vertically and was ignited at the botton. The film did not burn and was shown to be self-extinguishable.

Example 16

A 92.7% of a prepolymer of polymethyl methacrylate was mixed uniformly with a 8.3% ammonium sodium hydrogen phosphate $NH_4NaHPO_4.4H_2O$ which had been coated with a paraffin, then polymerization was continued to complete between two glass plates at 100° C.

The plate of polymethylmethacrylate obtained showed a good flame proofing property.

Example 17

A 92.5% of polystyrene was mixed with a 7.5% of ammonium dihydrogen hypophosphate $NH_4H_2PO_2$ to make chips.

From the chips, shaped materials were made which were all non-flammable.

Example 18

A 98.8 parts of a copolymer comprising 94% of acrylonitrile, and 6% of vinylacetate and 1.2 parts of ammonium hypophosphite $(NH_4)_2H_2P_2O_6$ which had been finely powdered and coated with a polyethylene was dissolved in dimethyl formamide to make a spinning solution. The solution was dry-spun in a usual way.

Using the fibers thus obtained, a carpet was prepared. A flame retardant property was tested using a urotropin method (Example 3). When the urotropin was burned out, the flame was ceased immediately.

Example 19

This example is the same as the example 1 except a 4% of ammonium phosphohexafluoride $NH_4PF_6$ was used as a flame retardant additive. The fibers obtained in this example showed an appreciable flame retardant property. When $NH_4PO_2F_2$ was used as an additive, a similar result was obtained.

Example 20

A 99 parts of a copolymer comprising 91% of acrylonitrile, 3% of vinylbromide, and 6% of vinylacetate, and 1 part of ammonium metaphosphate $NH_4PO_3$ were dissolved in a dimethylacetamide to make a spinning solution. The spinning solution was wet-spun in a usual way. The fibers obtained had a good self-extinguishable property.

Example 21

This example was the same as the example 11 except a 5% of ammonium magnesium phosphate $NH_4MgPO_4$ was used as a flame retardant additive.

The fibers obtained in the example had an excellent selfextinguishability and a good whiteness.

Ammonium cobaltphosphate $NH_4CoPO_4$ and ammonium mangan phosphate $NH_4MnPO_4$ showed similar effects as a flame retardant additive.

Example 22

A 95 parts of a copolymer comprising 92.7% acrylonitrile, 7% vinylacetate and 0.3% sodium methallyl sulfonate, and 5 parts of diamino phospho trichloride $Cl_3P(NH_2)_2$ which had been previously coated with a paraffin were dissolved in dimethyl acetamide to give a spinning solution. The fibers obtained from this spinning solution showed a good fire retardant property.

Example 23

A copolymer comprising 94% of acrylonitrile, 5.7% of methylacrylate and 0.3% of methallylsulfonate was dissolved in dimethylformamide to give a spinning solution. Ammonium salt of metaphosphimic acid $P_3N_3O_6H_3(NH_4)_3.H_2O$ was powdered and coated with a silicon grease using a similar method to that described in the example 13. A 3.8% (based on the copolymer) of the above coated material was added to the dope from which an acrylic fiber was prepared by a dry spinning.

The textile properties and whiteness of the fiber were similar to those for conventional acrylic fibers. A cloth made from the fiber obtained showed good self-extinguishability by a vertical test.

Example 24

A copolymer comprising 93% of acrylonitrile and 7% of vinylchloride was dissolved in a dimethylacetamide to give a spinning solution.

To this solution primary magnesium phosphate hydrate $MgH_4(PO_4)_2.3H_2O$ (3% based on the copolymer) which had previously coated by a paraffin of mp 69° C was added and the solution was wet-spun, followed by stretching 5 times their original length, then washed and dried. After being dried, fibers were annealed by steaming. The fibers obtained had similar textile properties and a good whiteness.

An analytical data showed all the magnesium phosphate was retained in the fiber.

After a cloth made from the fibers obtained had been dried at 105° for 3 hours, it was subjected to a flame retardant test by a vertical method.

The cloth showed an excellent self-extinguishable property. When the same inorganic compound was used without paraffin coating, the fibers obtained became yellowish during the processes of drying and annealing.

Example 25

A copolymer comprising 91% of acrylonitrile and 9% of methylacrylate was dissolved in an aqueous solution of 46% sodium thiocyanate to prepare a spinning solution having a copolymer concentration of 11%. To this solution, a powdered paraffin coated disodium phosphate $Na_2HPO_4$ (3% based on the copolymer) was added. The solution was spun into a spinning bath consisting of an aqueous solution of 12% sodium thiocyanite at $-3°$ C. Textile properties and a whiteness of the fiber obtained was similar to a conventional acrylic fiber.

A result of analysis showed that all the sodium phosphate used was retained in the fiber. A thick cloth made from the fiber was subjected to a vertical flame retardant test (JIS L1091-A-4). It was turned out the cloth had an excellent self-extinguishable property.

Example 26

A copolymer comprising 91% of acrylonitrile, 3% of vinylbromide, and 6% of acrylamide was dissolved in a dimethyl sulfoxide to prepare a spinning solution. To this, a 1.5% (based on the copolymer) of an equimolar mixture consisting of a paraffin coated disodium hydrogen phosphate hydrate $Na_2HPO_4.12H_2O$ and ammonium carbonate was added.

From this spinning solution, an acrylic fiber was prepared in the usual way. An analysis showed that all the inorganic materials were retained in the fiber. A cloth made from the fibers obtained showed an excellent self-extinguishable property both in a vertical and 45° test. A shaggy carpet made from the fiber showed perfect non-flammability by a urotropin test (Example 3).

While there have been described preferred embodiments of the invention, obviously modifications and variations are possible in light of the above teachings. It is therefore to be understood that within the scope of the appended claims, the invention may be practised otherwise than as specifically described.

What is claimed is:

1. A synthetic fiber containing in the form of finely powdered crystals coated with an inactive material at least one inorganic compound in an amount up to 10% based on the total weight of the fiber, said inactive material being selected from higher paraffin, aliphatic or aromatic hydrocarbon having more than 10 carbon atoms, petrolatam, paraffin jelly, liquid paraffin, mineral oil and vegetable oil, said inorganic compound comprising an ammonium salt of an acid selected from the group consisting of phosphoric acid and metaphosphoric acid, said synthetic fiber being made of polyvinyl alcohol or a copolymer of acrylonitrile.

2. A process for the production of the synthetic fiber according to claim 1 characterized in that during production of the synthetic fiber said inorganic material is added to a spinning solution and this spinning solution is extruded through holes of a spinneret.

3. The process according to claim 2 wherein said inorganic compounds are finely powdered and then coated with an inactive material being selected from higher paraffin, aliphatic or aromatic hydrocarbon having more than 10 carbon atoms, petrolatam, paraffin jelly, liquid paraffin, mineral oil and vegetable oil, and the coated inorganic compounds are added to said spinning solution.

4. The process of claim 1 in which said copolymer comprises 91–94% acrylonitrile.

5. The synthetic fiber according to claim 1, wherein said ammonium salt comprises ammonium dihydrogen phosphate, diammonium hydrogen phosphate or triammonium phosphate.

* * * * *